United States Patent
Miwa et al.

(10) Patent No.: US 10,096,410 B2
(45) Date of Patent: Oct. 9, 2018

(54) R-T-B BASED SINTERED MAGNET

(71) Applicant: TDK CORPORATION, Tokyo (JP)

(72) Inventors: Masashi Miwa, Tokyo (JP); Haruna Nakajima, Tokyo (JP); Koji Mitake, Tokyo (JP); Chikara Ishizaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 397 days.

(21) Appl. No.: 14/889,069

(22) PCT Filed: Jul. 3, 2014

(86) PCT No.: PCT/JP2014/067838
§ 371 (c)(1),
(2) Date: Nov. 4, 2015

(87) PCT Pub. No.: WO2015/002280
PCT Pub. Date: Jan. 8, 2015

(65) Prior Publication Data
US 2016/0086701 A1    Mar. 24, 2016

(30) Foreign Application Priority Data

Jul. 3, 2013  (JP) .................................. 2013-139857

(51) Int. Cl.
*H01F 1/01*    (2006.01)
*H01F 1/057*    (2006.01)
(Continued)

(52) U.S. Cl.
CPC ............. *H01F 1/01* (2013.01); *H01F 1/0577* (2013.01); *H02K 1/02* (2013.01); *H02K 1/278* (2013.01)

(58) Field of Classification Search
CPC ........... H01F 1/0577; H01F 1/01; H02K 1/02; H02K 1/278
(Continued)

(56) References Cited

U.S. PATENT DOCUMENTS 5,641,363 A    6/1997 Fukuno et al.
5,834,663 A    11/1998 Fukuno et al.
(Continued)

FOREIGN PATENT DOCUMENTS

CN    1157992 A    8/1997
JP    H04-6806 A    1/1992
(Continued)

OTHER PUBLICATIONS

Oct. 7, 2014 International Search Report issued in PCT/JP2014/067838.
(Continued)

*Primary Examiner* — Forrest M Phillips
(74) *Attorney, Agent, or Firm* — Oliff PLC

(57) ABSTRACT

An R-T-B based sintered magnet having $R_2T_{14}B$ crystal grains and a grain boundary formed by two or more adjacent $R_2T_{14}B$ crystal grains. An R—Co—Cu—N concentrated part whose concentrations of R, Co, Cu and N are respectively higher than those in the $R_2T_{14}B$ crystal grains may be in the grain boundary. An R—O—C concentrated part or an R—O—C—N concentrated part may be further provided in the grain boundary.

19 Claims, 6 Drawing Sheets

(51) Int. Cl.
*H02K 1/02* (2006.01)
*H02K 1/27* (2006.01)

(58) Field of Classification Search
USPC .......................................... 310/156, 156.01
See application file for complete search history.

(56) References Cited

U.S. PATENT DOCUMENTS

| | | | |
|---|---|---|---|
| 5,858,123 A | 1/1999 | Uchida et al. | |
| 5,997,804 A | 12/1999 | Uchida et al. | |
| 6,080,245 A | 6/2000 | Uchida et al. | |
| 8,425,695 B2* | 4/2013 | Hayakawa | H01F 1/0577 |
| | | | 148/101 |
| 9,773,599 B2* | 9/2017 | Miwa | H01F 7/021 |
| 2004/0118484 A1 | 6/2004 | Nishizawa et al. | |
| 2004/0166013 A1 | 8/2004 | Nishizawa et al. | |
| 2004/0177899 A1 | 9/2004 | Nishizawa et al. | |
| 2004/0187969 A1 | 9/2004 | Ishizaka et al. | |
| 2011/0279205 A1* | 11/2011 | Fukui | C22C 38/002 |
| | | | 335/302 |
| 2012/0024429 A1* | 2/2012 | Hayakawa | H01F 1/0577 |
| | | | 148/302 |

FOREIGN PATENT DOCUMENTS

| | | | | |
|---|---|---|---|---|
| JP | H04-330702 A | | 11/1992 | |
| JP | H07-272914 A | | 10/1995 | |
| JP | 2003-031409 A | | 1/2003 | |
| JP | 2003031409 A | * | 1/2003 | ........... H01F 1/0577 |
| JP | 2006-165008 A | | 6/2006 | |
| JP | 2011-210823 A | | 10/2011 | |
| JP | 2011-258935 A | | 12/2011 | |
| JP | 2012-028704 A | | 2/2012 | |
| WO | 2004/029995 A1 | | 4/2004 | |

OTHER PUBLICATIONS

Jan. 5, 2016 International Preliminary Report on Patentability issued in International Application No. PCT/JP2014/067838.

* cited by examiner

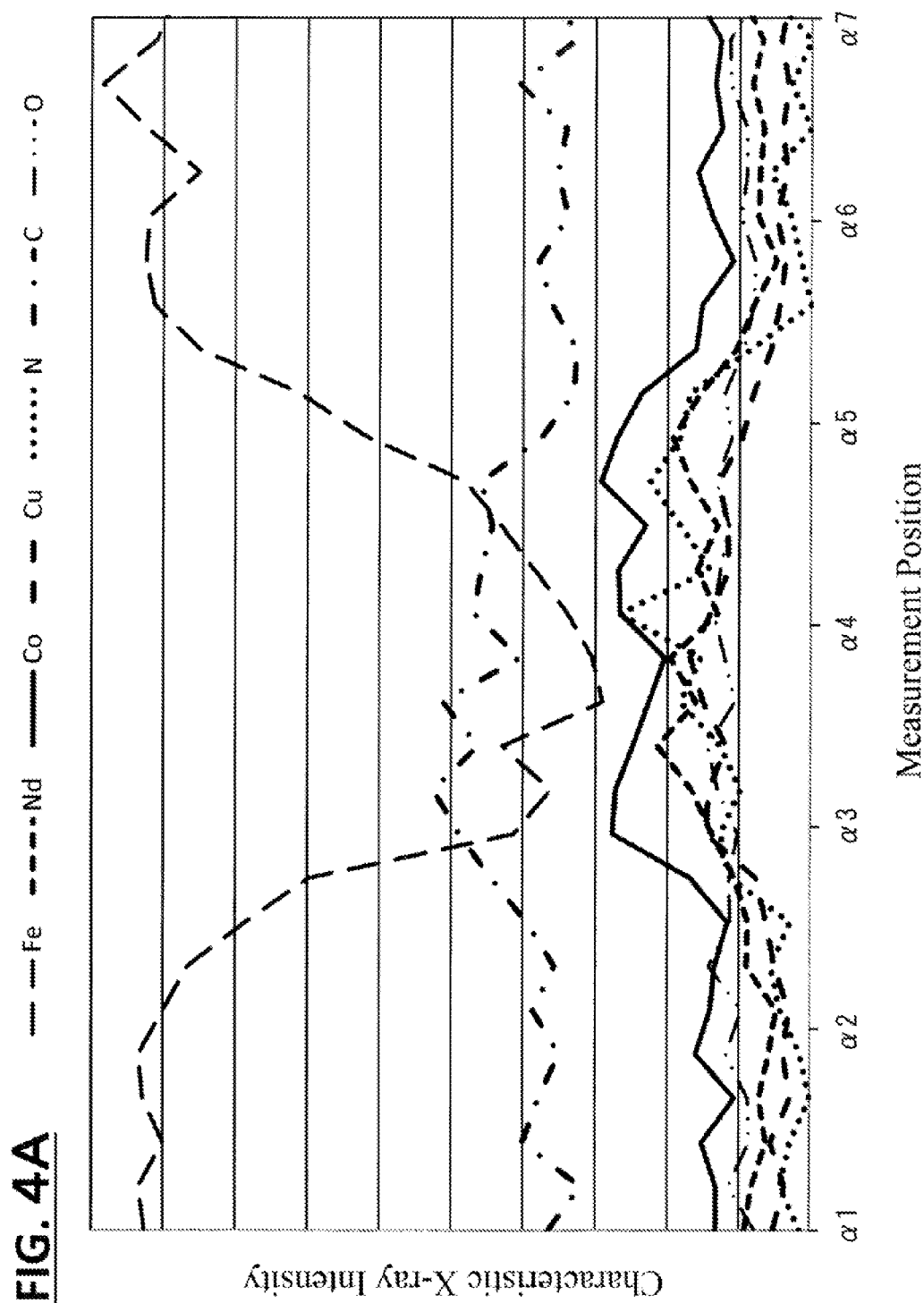

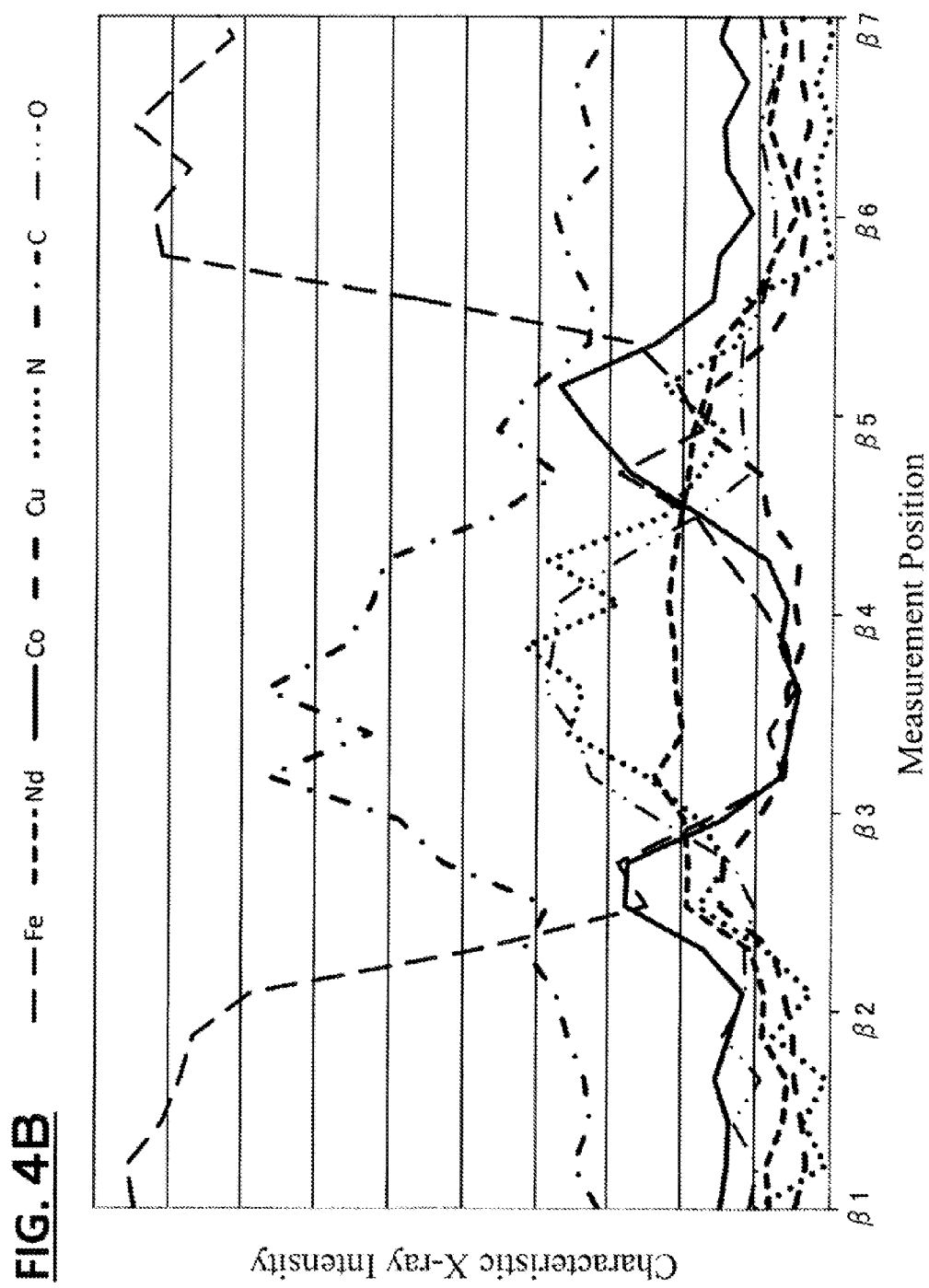

R-T-B BASED SINTERED MAGNET

TECHNICAL FIELD

This application is directed to an R-T-B based sintered magnet having rare earth elements (R), at least one or more of transition metal elements (T) essentially including Fe or Fe and Co, and Boron (B) as its main component.

BACKGROUND

Although an R-T-B ("R" represents one or more of rare earth elements and "T" represents one or more of transition metal elements including Fe or Fe and Co) based sintered magnet shows excellent magnetic properties, it tends to show a low corrosion resistance due to inclusion of easily oxidized rare earth elements as its main component.

Thus, to improve corrosion resistance of the R-T-B based sintered magnet, a magnetic body is generally subject to surface treatment, such as resin coating and plating. On the other hand, addition elements or internal structures of a magnetic body have been changing to improve corrosion resistance of the magnetic body itself. Improvement in corrosion resistance of a magnetic body itself is extremely important to enhance reliability of surface-treated products. This improvement allows products to be applied by surface treatment that is easier than resin coating or plating, and contributes to cost reduction of products.

For example, Patent Document 1 conventionally suggests a technique to improve corrosion resistance of a magnet by reducing carbon content in a permanent-magnet alloy to 0.04 mass % or less and controlling intermetallics R—C of rare earth element and carbon in a non-magnetic R-rich phase to 1.0 mass % or less. In addition, Patent Document 2 conventionally suggests a technique to improve corrosion resistance by setting Co concentration in an R-rich phase to 5 to 12 mass %.

However, in conventionally used R-T-B based sintered magnets, water such as water vapor under a use environment oxidizes "R" in the R-T-B based sintered magnet and generates hydrogen. Then, an R-rich phase in a grain boundary absorbs said hydrogen. As a result, corrosion of the R-rich phase progresses, and magnetic properties of the R-T-B based sintered magnet deteriorate.

An additive amount of lubricant, which is added for improving magnetic field orientation when pressing in a magnetic field, needs to greatly be decreased for reducing carbon content in a magnet alloy to 0.04 mass % or less, as Patent Document 1 suggests. Thus, degree of orientation of magnetic powder in a green compact decreases, and residual magnetic flux density Br after sintering decreases. As a result, a magnet having sufficient magnetic properties cannot be obtained.

Co additive amount in a raw material composition needs to rise for increasing Co concentration in an R-rich phase, as Patent Document 2 suggests. However, since Co also enters in a main phase of $R_2T_{14}B$ phase by replacing Fe, it is unable to increase Co concentration only in the R-rich phase and thus necessary to add Co beyond that required in the R-rich phase. Thus, production cost rises due to increase of using amount of expensive Co, and magnetic properties deteriorate due to substitution of Co for Fe in the main phase with more than necessary.

Patent Document List

Patent Document 1: Japanese Laid-Open Patent Publication No. H04-330702

Patent Document 2: Japanese Laid-Open Patent Publication No. H04-6806

SUMMARY

Problems to be Solved

Disclosed embodiments have been made by considering the above circumstances, and it is an object of disclosed embodiments to provide an R-T-B based sintered magnet having an excellent corrosion resistance and good magnetic properties.

Solution to Problem

To achieve the object, extensive studies about a mechanism of an R-T-B based sintered magnet corrosion were pursued. As a result, the following findings were made. First, hydrogen ($H_2$) is produced by corrosion reaction between water such as water vapor under a use environment and "R" in the R-T-B based sintered magnet. The hydrogen is stored in an R-rich phase present in a grain boundary in the R-T-B based sintered magnet, which accelerates change of an R-rich phase to hydroxide. A volume expansion of the R-T-B based sintered magnet, which is caused by hydrogen storage in the R-rich phase and a change of the R-rich phase to hydroxide, makes a crystal grain (main phase grain) constituting a main phase of the R-T-B based sintered magnet fall off the R-T-B based sintered magnet. Then, corrosion of "R" progresses inside the R-T-B based sintered magnet at an accelerated pace.

Thus, extensive studies about a method for preventing hydrogen storage in a grain boundary were pursued. As a result, the following findings were made. An R—Co—Cu—N concentrated part whose concentrations of rare earth (R), cobalt (Co), copper (Cu) and nitrogen (N) are higher than those in $R_2T_{14}B$ crystal grains is formed in a grain boundary (in particular, a polycrystalline grain boundary part formed by three or more adjacent $R_2T_{14}B$ crystal grains) formed by two or more adjacent $R_2T_{14}B$ crystal grains in the R-T-B based sintered magnet, which then makes it possible to prevent hydrogen storage in a grain boundary, to greatly improve corrosion resistance of the R-T-B based sintered magnet, and to have good magnetic properties. Disclosed embodiments have been made based on such knowledge.

That is, an R-T-B based sintered magnet according to embodiments comprises:
  a plurality of $R_2T_{14}B$ crystal grains; at least one grain boundary formed by two or more adjacent $R_2T_{14}B$ crystal grains; and an R—Co—Cu—N concentrated part in the at least one grain boundary, wherein concentrations of R, Co, Cu and N in the R—Co—Cu—N concentrated part are respectively higher than concentrations of R, Co, Cu and N in the plurality of $R_2T_{14}B$ crystal grains.

Substituting the R—Co—Cu—N concentrated part for R-rich areas present in grain boundary phases can achieve the following effects; hydrogen produced by corrosion reaction is effectively prevented from being stored in a grain boundary; corrosion of "R" is prevented from progressing inwardly; corrosion resistance of the R-T-B based sintered magnet improves to a large extent; and good magnetic properties are obtained. Note that, an R-rich area (R-rich phase) is defined as an R deposition phase that includes "R" more than the $R_2T_{14}B$ crystal grains do but includes at least "N" out of Co, Cu and N only approximately the same or less than the $R_2T_{14}B$ crystal grains.

The R-T-B based sintered magnet may further include an R—O—C concentrated part in the at least one grain boundary, wherein concentrations of R, O and C in the R—O—C concentrated part are respectively higher than concentrations of R, O and C in the plurality of $R_2T_{14}B$ crystal grains. This makes it possible to further prevent corrosion of "R" from progressing inwardly, to further improve corrosion resistance of the R-T-B based sintered magnet, and to obtain good magnetic properties.

The R—O—C concentrated part may be formed within a boundary defined by the R—Co—Cu—N concentrated part in the grain boundary. This makes it possible to obtain an excellent corrosion resistance and to further improve magnetic properties.

The R-T-B based sintered magnet may further include an R—O—C—N concentrated part in the at least one grain boundary, wherein concentrations of R, O, C and N in the R—O—C—N concentrated part are respectively higher than concentrations of R, O, C and N in the plurality of $R_2T_{14}B$ crystal grains. This makes it possible to further prevent corrosion of "R" from progressing inwardly, to further improve corrosion resistance of the R-T-B based sintered magnet, and to obtain good magnetic properties.

In embodiments, the R—O—C—N concentrated part may be formed within a boundary defined by the R—Co—Cu—N concentrated part in the grain boundary. A ratio of an atom number composition of R to a total atom number composition in the R—Co—Cu—N concentrated part may be in the range of 60% to 65%, a ratio of atom number composition of Co to a total atom number composition in the R—Co—Cu—N concentrated part is in the range of 10% to 14%, a ratio of atom number composition of Cu to a total atom number composition in the R—Co—Cu—N concentrated part is in the range of 4% to 7%, and a ratio of atom number composition of N to a total atom number composition in the R—Co—Cu—N concentrated part is in the range of 10% to 15%.

In embodiments, the at least one grain boundary may be formed by two or three adjacent $R_2T_{14}B$ crystal grains. The plurality of $R_2T_{14}B$ crystal grains may have a tetragonal crystal structure. The plurality of $R_2T_{14}B$ crystal grains may have an average crystal diameter in the range of 1 μm to 30 μm.

In embodiments, the content of R in the plurality of $R_2T_{14}B$ crystal grains may be in the range of 25 mass % to 35 mass %. The content of B in the plurality of $R_2T_{14}B$ crystal grains may be in the range of 0.5 mass % to 1.5 mass %. T may comprise Fe and Co and the content of Co in the plurality of $R_2T_{14}B$ crystal grains may be in the range of 0.3 mass % to 4.0 mass %.

In embodiments, the R—O—C concentrated part may have a cubic crystal structure. A ratio of an atom number of O to an atom number of R in the R—O—C concentrated part may be in the range of less than 1 and the ratio of the atom number of O to the atom number of R in the R—O—C concentrated part may be in the range of 0.5 to 0.7.

In a further embodiment, there is provided an electric motor having a rotor comprising a permanent magnet, wherein the permanent magnet includes the R-T-B based sintered magnet comprising a plurality of $R_2T_{14}B$ crystal grains; at least one grain boundary formed by two or more adjacent $R_2T_{14}B$ crystal grains; and an R—Co—Cu—N concentrated part in the at least one grain boundary, wherein concentrations of R, Co, Cu and N in the R—Co—Cu—N concentrated part are respectively higher than concentrations of R, Co, Cu and N in the plurality of $R_2T_{14}B$ crystal grains.

Advantageous Effects

According to embodiments, an R-T-B based sintered magnet capable of showing an excellent corrosion resistance and good magnetic properties is obtained.

BRIEF DESCRIPTION OF THE DRAWINGS

FIG. 4A is a graph showing characteristic X-ray intensity of each element when analysis with EPMA is carried out around a grain boundary formed by a plural number of $R_2T_{14}B$ crystal grains of an R-T-B based sintered magnet according to an example of an embodiment.

FIG. 4B is a graph showing characteristic X-ray intensity of each element when analysis with EPMA is carried out around a grain boundary formed by a plural number of $R_2T_{14}B$ crystal grains of an R-T-B based sintered magnet according to another example of an embodiment.

DETAILED DESCRIPTION

Hereinafter, disclosed embodiments will be described with reference to the drawings.

First Embodiment

<R-T-B Based Sintered Magnet>

Figure 1A:
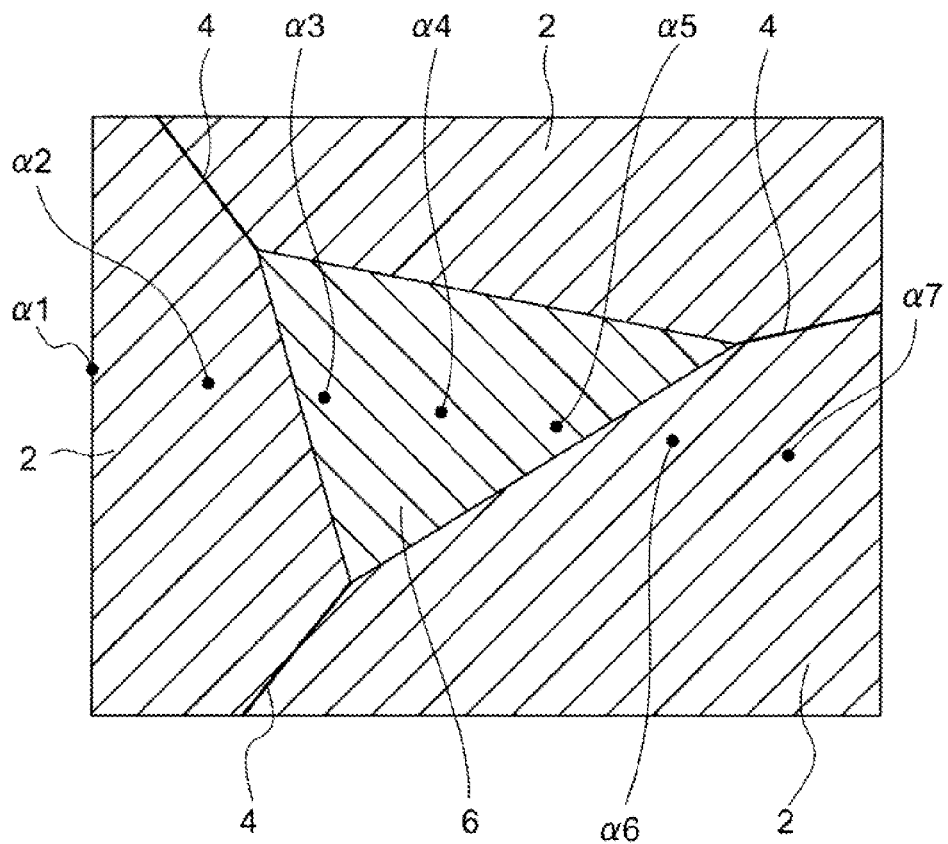
FIG. 1A is a diagram schematically showing a backscattered electron image around a grain boundary formed by a plural number of $R_2T_{14}B$ crystal grains of an R-T-B based sintered magnet according to an embodiment.

An embodiment of an R-T-B based sintered magnet according to a first embodiment will be described. As shown in FIG. 1A, the R-T-B based sintered magnet according to the present embodiment has grains (main phases) 2 made of $R_2T_{14}B$ crystal grains, and an R—Co—Cu—N concentrated part whose concentrations of R, Co, Cu and N are respectively higher than those in the $R_2T_{14}B$ crystal grains is in a grain boundary formed by two or more adjacent grains 2.

The grain boundary includes two-grain interfaces 4 formed by two $R_2T_{14}B$ crystal grains and a triple junction 6 (polycrystalline grain boundary part) formed by three or more adjacent $R_2T_{14}B$ crystal grains. In addition, the R—Co—Cu—N concentrated part is present in a grain boundary formed by two or more adjacent crystal grains, and has each concentration of R, Co, Cu and N higher than that in the $R_2T_{14}B$ crystal grains. As long as the R—Co—Cu—N concentrated part includes R, Co, Cu and N as its main component, it may include the other components.

The R-T-B based sintered magnet according to the present embodiment is a sintered body formed by using an R-T-B based alloy. The R-T-B based sintered magnet according to the present embodiment has a main phase and a grain boundary. The main phase includes an $R_2T_{14}B$ compound expressed by $R_2T_{14}B$ ("R" represents at least one of rare earth elements, "T" represents one or more transition metal elements including Fe or Fe and Co, and "B" represents B or B and C). The grain boundary includes "R" more than the $R_2T_{14}B$ compound does.

"R" represents at least one of rare earth elements. The rare earth elements are Sc, Y and lanthanoid elements, which belong to the third group of a long period type periodic table. The lanthanoid elements include La, Ce, Pr, Nd, Sm, Eu, Gd, Tb, Dy, Ho, Er, Tm, Yb, Lu and the like. The rare earth elements are classified into light rare earth and heavy rare earth. Heavy rare earth elements (hereinafter, also referred as RH) include Gd, Tb, Dy, Ho, Er, Tm, Yb and Lu, while light rare earth elements (hereinafter, also referred as RL) include the other rare earth elements. In the present embodiment, "R" preferably includes RL (rare earth elements including at least either or both of Nd and Pr) in view of production cost and magnetic properties, and further, "R" more preferably includes both RL (rare earth elements including at least either or both of Nd and Pr) and RH (rare earth elements including at least either or both of Dy and Tb) in view of improving magnetic properties.

In the present embodiment, "T" represents one or more transition metal elements including Fe or Fe and Co. "T" may be Fe alone, or Fe is partly substituted by Co. In case Fe is partly substituted by Co, temperature properties can be improved without deteriorating magnetic properties.

The transition metal elements other than Fe or Fe and Co include such as Ti, V, Cu, Cr, Mn, Ni, Zr, Nb, Mo, Hf, Ta and W. "T" may further include at least one element, such as Al, Ga, Si, Bi and Sn, in addition to the transition metal elements.

In the R-T-B based sintered magnet according to the present embodiment, "B" can be partly substituted for carbon (C). This makes it possible to easily produce the magnets and to achieve cost reduction in them. In addition, a substitution amount of "C" is determined not to substantially affect magnetic properties.

In addition, O, C, Ca and the like may be mixed inevitably. Each of them may be included in an amount of approximately 0.5 mass % or less.

The main phase of the R-T-B based sintered magnet according to the present embodiment is the $R_2T_{14}B$ crystal grains, and the $R_2T_{14}B$ crystal grains have a crystal structure of $R_2T_{14}B$ type tetragonal. An average diameter of the $R_2T_{14}B$ crystal grains is typically 1 μm to 30 μm or so.

The grain boundary of the R-T-B based sintered magnet according to the present embodiment includes such as an R-rich phase having "R" more than the R—Co—Cu—N concentrated part and the $R_2T_{14}B$ crystal grains. In addition to the R-rich phase, the grain boundary may include a B-rich phase having a high compound ratio of boron (B) atom.

A content of "R" in the R-T-B based sintered magnet according to the present embodiment is 25 mass % to 35 mass %, preferably 28 mass % to 33 mass %. When the content of "R" is less than 25 mass %, an $R_2T_{14}B$ compound to be the main phase of the R-T-B based sintered magnet is generated insufficiently. Thus, magnetic properties may deteriorate due to deposition of such as α-Fe having soft magnetism.

A content of "B" in the R-T-B based sintered magnet according to the present embodiment is 0.5 mass % to 1.5 mass %, preferably 0.7 mass % to 1.2 mass %, and more preferably 0.7 mass % to 1.0 mass %. When the content of "B" is less than 0.5 mass %, coercivity HcJ tends to decrease. When the content of "B" is more than 1.5 mass %, residual magnetic flux density Br tends to decrease.

As mentioned above, "T" represents one or more transition metal elements including Fe or Fe and Co. A content of Fe in the R-T-B based sintered magnet according to the present embodiment is a substantial residue of a constituent of the R-T-B based sintered magnet, and Fe may be partly substituted for Co. A content of Co is preferably 0.3 mass % to 4.0 mass %, more preferably 1.0 mass % to 2.5 mass %. When the content of Co is more than 4 mass %, residual magnetic flux density tends to decrease, and the R-T-B based sintered magnet according to the present embodiment tends to be expensive. When the content of Co is less than 0.3 mass %, the R—Co—Cu—N concentrated part is hard to be formed, and corrosion resistance tends to deteriorate. Ti, V, Cr, Mn, Ni, Cu, Zr, Nb, Mo, Hf, Ta, W and the like are exemplified as the transition metal elements other than Fe or Fe and Co. In addition to transition metal elements, "T" may further include at least one of elements such as Al, Ga, Si, Bi and Sn.

The R-T-B based sintered magnet according to the present embodiment includes Cu, and a content of Cu is preferably 0.01 to 1.5 mass %, more preferably 0.05 to 1.0 mass %. Inclusion of Cu enables a higher coercivity, a higher corrosion resistance, and a temperature property improvement of the magnet to be obtained. When the content of Cu is more than 1.5 mass %, residual magnetic flux density tends to decrease. When the content of Cu is less than 0.01 mass %, the R—Co—Cu—N concentrated part is hard to be formed, and corrosion resistance tends to deteriorate.

The R-T-B based sintered magnet according to the present embodiment preferably includes Al. Inclusion of Al enables a higher coercivity, a higher corrosion resistance, and a temperature property improvement of the magnet to be obtained. A content of Al is preferably 0.03 mass % to 0.4 mass %, more preferably 0.05 mass % to 0.25 mass %.

The R-T-B based sintered magnet according to the present embodiment may include a certain amount of oxygen (O). The certain amount varies based on other parameters or so and is suitably determined. The amount of oxygen is preferably 500 ppm or more in view of corrosion resistance, and is preferably 2000 ppm or less in view of magnetic properties.

The R-T-B based sintered magnet according to the present embodiment may include carbon (C). An amount of carbon varies based on other parameters or so and is suitably determined, but magnetic properties deteriorate when a carbon amount increases.

An amount of nitrogen (N) in the R-T-B based sintered magnet according to the present embodiment is preferably 100 to 2000 ppm, more preferably 200 to 1000 ppm, and still more preferably 300 to 800 ppm. An adding method of nitrogen (N) in the R-T-B based sintered magnet is not limited, but for example, it may be introduced by heat treatment of a second alloy under an atmosphere of nitrogen gas having a predetermined concentration. Instead, nitrogen may be introduced into the grain boundary of the R-T-B based sintered magnet by using such as aids including nitrogen as pulverization aids of the second alloy or by using material including nitrogen as a treatment agent of the second alloy.

A measurement method of oxygen amount, carbon amount and nitrogen amount in the R-T-B based sintered magnet may be a conventionally well-known method. For instance, oxygen amount may be measured by an inert gas fusion—non-dispersive infrared absorption method, carbon amount may be measured by combustion in an oxygen airflow—infrared absorption method, and nitrogen amount may be measured by an inert gas fusion—thermal conductivity method.

In the R-T-B based sintered magnet according to the present embodiment, N atom number in the R—Co—Cu—N concentrated part is preferably 7 to 15% of the sum of R, Fe, Co, Cu, and N atom numbers. Presence of the R—Co—Cu—N concentrated part having "N" with such a ratio can achieve the following effects: hydrogen, which is produced by corrosion reaction between water and "R" in the R-T-B based sintered magnet, is effectively prevented from being stored in an inner R-rich phase; corrosion of the R-T-B based sintered magnet is prevented from progressing inwardly; and the R-T-B based sintered magnet of the present embodiment shows good magnetic properties.

The R-T-B based sintered magnet according to the present embodiment has the R—Co—Cu—N concentrated part, present in the grain boundary, whose concentrations of R, Co, Cu and N are respectively higher than those in the $R_2T_{14}B$ crystal grains. Note that, the R—Co—Cu—N concentrated part is mainly composed of R, Co, Cu and N as mentioned above, but may include the other components.

In the R-T-B based sintered magnet according to the present embodiment, the R—Co—Cu—N concentrated part is formed in the grain boundary. In an R-T-B based sintered magnet without the R—Co—Cu—N concentrated part, it becomes hard to sufficiently prevent hydrogen, which is caused by corrosion reaction due to water such as water vapor under a use environment, from being stored in a grain boundary, and thus corrosion resistance of the R-T-B based sintered magnet according to the present embodiment deteriorates.

In the present embodiment, the R—Co—Cu—N concentrated part is formed in the grain boundary, which can demonstrate the following effects: hydrogen, which is generated by the fact that water such as water vapor under a use environment invades inside the R-T-B based sintered magnet and reacts with "R" therein, is effectively prevented from being stored in the whole grain boundary; corrosion of the R-T-B based sintered magnet is prevented from progressing inwardly; and good magnetic properties are obtained.

That is, in the present embodiment, hydrogen, which is generated by the corrosion reaction between water that has invaded in the R-T-B based sintered magnet and "R" in the R-T-B based sintered magnet, is more effectively prevented from being stored in the grain boundary. Thus, corrosion of the R-T-B based sintered magnet can be prevented from further progressing inwardly. This enables both a further improvement in corrosion resistance and good magnetic properties of the R-T-B based sintered magnet according to the present embodiment.

Hydrogen, which is generated by the corrosion reaction between water such as water vapor under a use environment and "R" in the R-T-B based sintered magnet, is stored in the R-rich phase present in the grain boundary of the R-T-B based sintered magnet. This makes corrosion of the R-T-B based sintered magnet progress inwardly at an accelerated pace.

Namely, corrosion of the R-T-B based sintered magnet is considered to progress with the following processes. First, an R-rich phase present in a grain boundary is easily oxidized, and thus "R" in R-rich phase present in a grain boundary is oxidized by water, such as water vapor under a use environment. Then, said "R" corrodes, changes to a hydroxide, and produces hydrogen during these processes.

$$2R+6H_2O \rightarrow 2R(OH)_3+3H_2 \quad (I)$$

Next, the produced hydrogen is stored in an uncorroded R-rich phase.

$$2R+xH_2 \rightarrow 2RH_x \quad (II)$$

Then, an R-rich phase is more easily corroded due to the hydrogen storage, and hydrogen is produced in an amount more than the stored amount in the R-rich phase due to corrosion reaction between the hydrogen stored R-rich phase and water.

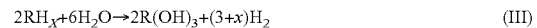

$$2RH_x+6H_2O \rightarrow 2R(OH)_3+(3+x)H_2 \quad (III)$$

The corrosion of the R-T-B based sintered magnet progresses inside thereof by the above chain reactions (I) to (III), and an R-rich phase changes to an R hydroxide and to an R hydride. Stress is accumulated by a volume expansion associated with this change, which leads to a falling of crystal grain (main phase grain) constituting a main phase of the R-T-B based sintered magnet. Then, a newly formed surface of the R-T-B based sintered magnet emerges due to the falling of crystal grain of the main phase, which makes the corrosion of the R-T-B based sintered magnet further progress inside thereof.

The R-T-B based sintered magnet according to the present embodiment has an R—Co—Cu—N concentrated part in a grain boundary, especially in a triple junction. This concentrated part is difficult to store hydrogen, which makes it possible to prevent hydrogen produced by corrosion reaction from being stored in the internal R-rich phase and to prevent corrosion by the above processes from progressing inside. In addition, the R—Co—Cu—N concentrated part is difficult to be oxidized compared with the R-rich phase, which also makes it possible to prevent the corrosion from producing hydrogen itself. Thus, the R-T-B based sintered magnet of the present embodiment can substantially improve corrosion resistance thereof. In the present embodiment, an R-rich phase required for appearance of coercivity HcJ may remain in two-grain interfaces 4 shown in FIG. 1A.

As described below, the R-T-B based sintered magnet according to the present embodiment can be manufactured by adding a second alloy, which mainly forms a grain boundary phase, in addition to an R-T-B based raw material alloy (first alloy), which mainly forms a main phase, and by controlling manufacturing conditions such as a nitrogen concentration in an atmosphere of production processes. Alternatively, a raw material to be a nitrogen source may be added as needed. Note that, the present embodiment will describe a two-alloy method, where a raw material powder is produced by mixing two alloys of the first alloy and the second alloy, but that a one-alloy method, where a single alloy is used without separating the first alloy and the second alloy, may be employed.

The R—Co—Cu—N concentrated part formed in a grain boundary of the R-T-B based sintered magnet according to the present embodiment is considered to be formed as follows. That is, it is considered that R, Co, Cu and nitrogen present in the second alloy form a compound during such as a coarse pulverization step and/or a sintering step, and that the compound deposits in the grain boundary in a form of R—Co—Cu—N concentrated part.

The R-T-B based sintered magnet according to the present embodiment is generally used after shaping into any form. The shape of the R-T-B based sintered magnet according to the present embodiment is not limited, and any shape may be used. For example, a columnar shape such as a rectangular parallelepiped, a hexahedron, a tabular or a quadratic pole may be used, and an R-T-B based sintered magnet whose cross section has a C-shaped cylindrical shape may be used. Bottom surface of the quadratic pole may be a rectangle or a square.

The R-T-B based sintered magnet according to the present embodiment includes both a magnet product with the present magnet magnetized after being machined and a magnet product having the unmagnetized present magnet.

<Manufacturing Method of the R-T-B Based Sintered Magnet>

Figure 2:
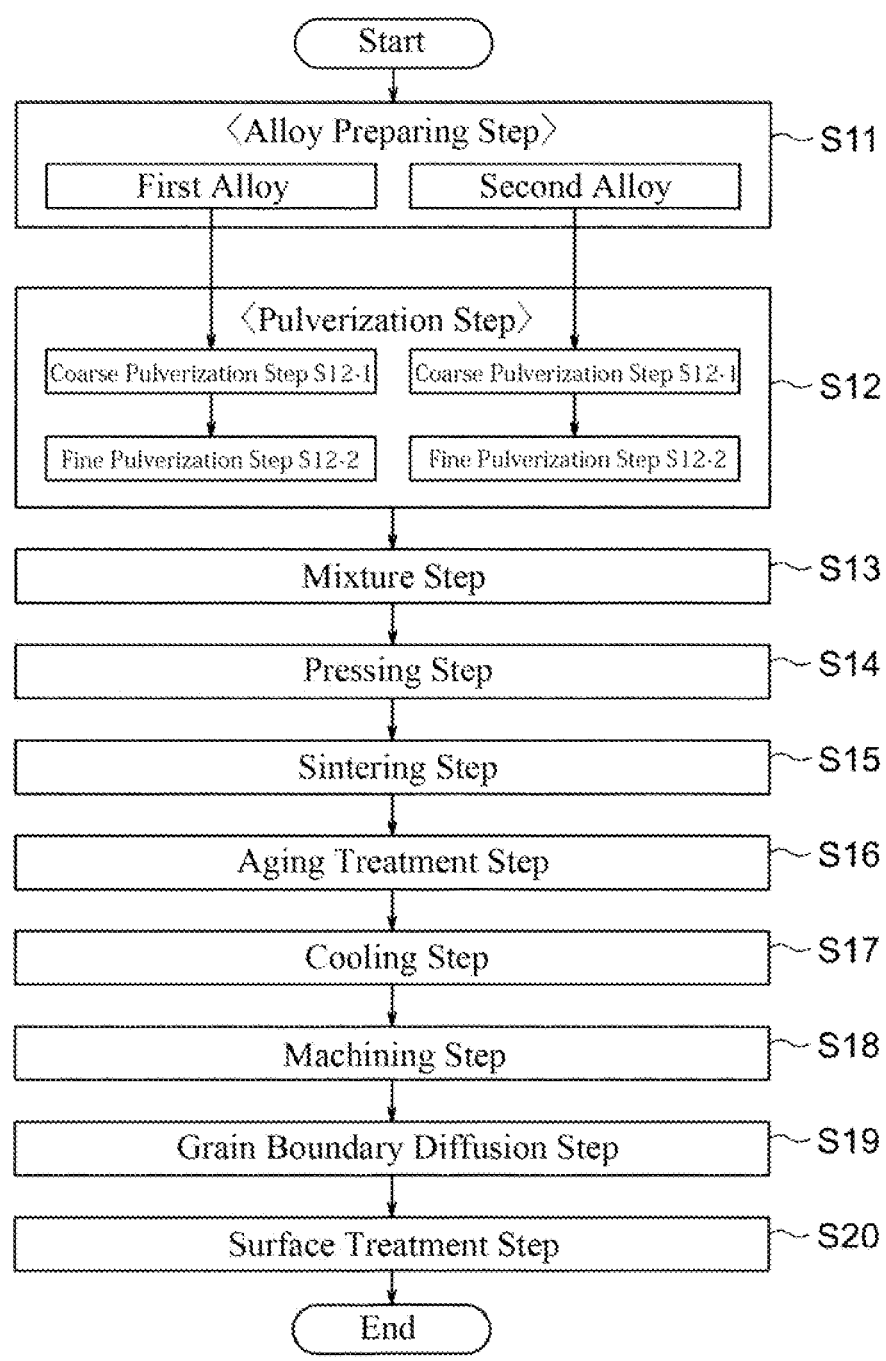
FIG. 2 is a flow chart showing an example of a production method of the R-T-B based sintered magnet according to an embodiment.

An example of manufacturing method of the R-T-B based sintered magnet according to the present embodiment comprising the above structures will be described in reference to drawings. FIG. 2 is a flow chart indicating an example of manufacturing method of an R-T-B based sintered magnet according to an embodiment. As shown in FIG. 2, a manufacturing method of the R-T-B based sintered magnet according to the present embodiment includes the following steps.

(a) Alloy preparing step for preparing a first alloy and a second alloy (Step S11)
(b) Pulverization step for pulverizing the first alloy and the second alloy (Step S12)
(c) Mixture step for mixing first alloy powder and second alloy powder (Step S13)
(d) Pressing step for pressing the mixed powder (Step S14)
(e) Sintering step for sintering a green compact and obtaining an R-T-B based sintered magnet (Step S15)
(f) Aging treatment step for performing aging treatment to the R-T-B based sintered magnet (Step S16)
(g) Cooling step for cooling the R-T-B based sintered magnet (Step S17)
(h) Machining step for machining the R-T-B based sintered magnet (Step S18).
(i) Grain boundary diffusion step for diffusing a heavy rare earth element in a grain boundary of the R-T-B based sintered magnet (Step S19)
(j) Surface treatment step for performing surface treatment to the R-T-B based sintered magnet (Step S20)

[Alloy Preparing Step: Step S11]

A first alloy, which mainly forms a main phase, and a second alloy, which mainly forms a grain boundary phase, in the R-T-B based sintered magnet according to the present embodiment are prepared (Alloy Preparing Step (Step S11)). In Alloy Preparing Step (Step S11), raw material metals corresponding to a composition of the R-T-B based sintered magnet according to the present embodiment are melted in vacuum or in an inert gas atmosphere of an inert gas such as Ar gas, and the melted raw material metals are cast. As a result, the first alloy and the second alloy each having a desired composition are manufactured. Note that, the present embodiment will describe a two-alloy method, where a raw material powder is produced by mixing two alloys of the first alloy and the second alloy, but that a one-alloy method, where a single alloy is used without separating the first alloy and the second alloy, may be employed.

For instance, the raw material metal may be a rare earth metal, a rare earth alloy, a pure iron, ferro-boron, and further, their alloys and compounds. A casting method for casting the raw material metal includes such as an ingot casting method, a strip casting method, a book molding method, a centrifugal casting method and the like. When the obtained raw material alloy includes solidification segregation, it is homogenized as needed. The homogenization of the raw material alloy is performed under an atmosphere of vacuum or inert gas at a temperature of 700° C. to 1500° C. for an hour or longer. Thus, an alloy for R-T-B based sintered magnet is melted and homogenized.

[Pulverization Step: Step S12]

After the first alloy and the second alloy are manufactured, said first alloy and said second alloy are pulverized (Pulverization Step (Step S12)). In Pulverization Step (Step S12), after the first alloy and the second alloy are manufactured, said first alloy and said second alloy are separately pulverized to make powder. Note that, the first alloy and the second alloy may be pulverized together.

Pulverization Step (Step S12) includes Coarse Pulverization Step (Step S12-1), which performs pulverization until a particle diameter becomes several hundred μm to several mm or so, and Fine Pulverization Step (Step S12-2), which performs pulverization until a particle diameter becomes a several μm or so.

(Coarse Pulverization Step (Step S12-1))

The first alloy and the second alloy are coarsely pulverized until each of the particle diameters becomes several hundred μm to several mm or so (Coarse Pulverization Step (Step S12-1)). As a result, coarsely pulverized powders of the first alloy and the second alloy are obtained. The coarse pulverization can be performed as follows: hydrogen is stored in the first alloy and the second alloy; said hydrogen is emitted based on a difference of capable hydrogen storage amount among the different phases; dehydrogenation is performed; and pulverization occurs in a self-collapsed way (hydrogen storage pulverization).

An additive amount of nitrogen required for forming the R—Co—Cu—N concentrated part can be controlled by adjusting the nitrogen gas concentration of an atmosphere during the dehydrogenation treatment in this hydrogen storage pulverization of the second alloy. An optimum nitrogen gas concentration varies based on a composition of a raw material alloy and the like, but is preferably 150 ppm or more, more preferably 200 ppm or more, and still more preferably 300 ppm or more. Note that, in hydrogen storage pulverization of the first alloy, nitrogen gas concentration is preferably less than 150 ppm, more preferably 100 ppm or less, and still more preferably 50 ppm or less.

Note that, Coarse Pulverization Step (Step S12-1) may be performed by using a coarse pulverizer, such as a stamp mill, a jaw crusher and a brown mill, under an inert gas atmosphere other than using the above-mentioned hydrogen storage pulverization.

To obtain high magnetic properties, each step from Pulverization Step (Step S12) to Sintering Step (Step S15) preferably has an atmosphere of low oxygen concentration. Oxygen concentration is adjusted by such as controlling an atmosphere of each manufacturing step. When oxygen concentration of each manufacturing step is high, a rare earth element in powder of the first alloy and the second alloy is oxidized, and an R oxide is generated. Then, the R oxide deposits as it is in a grain boundary without being reduced during sintering, and as a result, Br of the R-T-B based sintered magnet to be obtained decreases. Thus, oxygen concentration in each step is preferably 100 ppm or less, for example.

(Fine Pulverization Step: Step S12-2)

After coarsely pulverizing the first alloy and the second alloy, the obtained coarsely pulverized powders of said first alloy and said second alloy are finely pulverized until their average particle diameters become several μm or so (Fine Pulverization Step (Step S12-2)). As a result, finely pulverized powders of the first alloy and the second alloy are obtained. The coarsely pulverized powder is further finely pulverized, which can obtain finely pulverized powder having particles of preferably 1 µm to 10 µm, more preferably 3 µm to 5 µm.

Note that, in the present embodiment, the finely pulverized powder is obtained by separately pulverizing the first alloy and the second alloy, but said finely pulverized powder may be obtained after mixing the coarsely pulverized powder of the first alloy and that of the second alloy in Fine Pulverization Step (Step S12-2).

The fine pulverization is performed by further pulverizing the coarsely pulverized powder using a fine pulverizer, such as jet mill, ball mill, vibrating mill and wet attritor, while suitably adjusting conditions such as pulverization time. The jet mill performs pulverization as follows. The jet mill discharges an inert gas (e.g., $N_2$ gas) through a narrow nozzle at high pressure and produces a high speed gas flow. This high speed gas flow accelerates coarsely pulverized powder of a first alloy and a second alloy, and causes an impact among coarsely pulverized powder of the first alloy and the second alloy, or an impact between said coarsely pulverized powder and a target or a container wall.

When finely pulverizing the coarsely pulverized powder of the first alloy and the second alloy, adding pulverization aids, such as zinc stearate and oleic amide, can obtain a finely pulverized powder with high orientation at pressing.

[Mixture Step: Step S13]

After finely pulverizing the first alloy and the second alloy, each of the finely pulverized powder is mixed under a low oxygen atmosphere (Mixture Step (Step S13)). A mixed powder is then obtained. The low oxygen atmosphere is formed as an inert gas atmosphere, such as $N_2$ gas and Ar gas atmosphere. Compounding ratio of the first alloy powder and the second alloy powder is preferably 80/20 to 97/3 in mass ratio, more preferably 90/10 to 97/3 in mass ratio.

In Pulverization Step (Step S12), as is the case with separately pulverizing the first alloy and the second alloy, compounding ratio of the first alloy and the second alloy when they are pulverized together is preferably 80/20 to 97/3 in mass ratio, more preferably 90/10 to 97/3 in mass ratio.

In the present embodiment, the first alloy and the second alloy are preferred to have different alloy compositions. For example, the second alloy contains Cu and Co more than the first alloy does.

Mass % of Co contained in the second alloy is preferably 1% to 80%, more preferably 3% to 60%. The first alloy may contain Co or may not contain Co. When the first alloy contains Co, Mass % of Co contained in the first alloy is preferably 1% or less. Mass % of Cu contained in the second alloy is preferably 0.2% to 20%, more preferably 0.5% to 10%. The first alloy may contain Cu or may not contain Cu. When the first alloy contains Cu, Mass % of Cu contained in the first alloy is preferably 0.2% or less.

[Pressing Step: Step S14]

After mixing the first alloy powder and the second alloy powder, the mixed powder is pressed to an objective form (Pressing Step (Step S14)). In Pressing Step (Step S14), the mixed powder of the first alloy powder and the second alloy powder is filled in a press mold held by an electromagnet and then pressed to form the mixed powder to any shape. At this time, magnetic field is applied, and a predetermined orientation is produced to a raw material powder by the application. Then, pressing is performed in the magnetic field while crystal axis is oriented. Consequently, a green compact is obtained. The obtained green compact is oriented to a particular direction, and thus an anisotropy R-T-B based sintered magnet having stronger magnetism is obtained.

Pressurization during pressing is preferably 30 MPa to 300 MPa. Magnetic field is preferably applied at 950 kA/m to 1600 kA/m. Magnetic field to be applied is not limited to magnetostatic field, and may be pulsed magnetic field. Also, magnetostatic field and pulsed magnetic field may be used together.

Note that, in addition to dry pressing, which presses the mixed powder as it is as mentioned above, the pressing method may include wet pressing, which presses slurry where a raw material powder is dispersed in a solvent such as an oil.

A green compact obtained by pressing the mixed powder is not limited to have a particular shape, and may have any shape, such as a rectangular parallelepiped, a tabular shape, a columnar shape and a ring shape, according to a desired shape of R-T-B based sintered magnet.

[Sintering Step: Step S15]

A green compact obtained by being pressed to an objective shape in a magnetic field is sintered under a vacuum or an inert gas atmosphere, and then an R-T-B based sintered magnet is obtained (Sintering Step (Step S15)). A sintering temperature is required to be adjusted by considering every condition, such as composition, pulverization method, and a difference between particle diameter and particle diameter distribution. For example, the green compact is sintered by performing heat treatment under a vacuum or the presence of inert gas at 1000° C. to 1200° C. for an hour to 10 hours. As a result, a mixed powder produces a liquid phase sintering, and then an R-T-B based sintered magnet (sintered body of R-T-B based sintered magnet) having an improved volume ratio of main phase is obtained. After sintering the green compact, a sintered body is preferred to be rapidly cooled in view of improving production efficiency.

[Aging Treatment Step: Step S16]

After sintering the green compact, the R-T-B based sintered magnet is age treated (Aging Treatment Step (Step S16)). After the sintering, an aging treatment is performed to the R-T-B based sintered magnet, for example, by holding the obtained R-T-B based sintered magnet at a temperature that is lower than during the sintering. Treatment conditions of the aging treatment are suitably adjusted by considering how many times the aging treatment is performed. For example, the aging treatment may be performed by a two-heating step, which includes both a heating step at 700° C. to 900° C. for 1 to 3 hours and a heating step at 500° C. to 700° C. for 1 to 3 hours, or may be performed by a one-heating step, which includes a heating step at around 600° C. for 1 to 3 hours. Such an aging treatment can improve magnetic properties of the R-T-B based sintered magnet. Aging Treatment Step (Step S16) may be performed after Machining Step (Step S18) or Grain Boundary Diffusion Step (Step S19).

[Cooling Step: Step S17]

After performing aging treatment to the R-T-B based sintered magnet, said R-T-B based sintered magnet is rapidly cooled under Ar gas atmosphere (Cooling Step (Step S17)). As a result, the R-T-B based sintered magnet according to the present embodiment can be obtained. Cooling rate is not limited, and is preferably 30° C./min. or more.

[Machining Step: Step S18]

The obtained R-T-B based sintered magnet may be machined to a desired shape as needed (Machining Step: Step S18). The machining method may include a shaping process, such as cutting and grinding, and a chamfering process, such as barrel polishing.

[Grain Boundary Diffusion Step: Step S19]

A step where heavy rare earth elements are further diffused in a grain boundary of the machined R-T-B based sintered magnet may be further performed (Grain Boundary Diffusion Step: Step S19). The grain boundary diffusion can be performed as follows: A heat treatment is performed after a compound including a heavy rare earth element is adhered on the surface of R-T-B based sintered magnet by such as application and deposition. The grain boundary diffusion can be also performed as follows: A heat treatment is performed to the R-T-B based sintered magnet under an atmosphere including a vapor of heavy rare earth elements. As a result, coercivity of the R-T-B based sintered magnet can be further improved.

[Surface Treating Step: Step S20]

A surface treatment, such as plating, resin coating, oxidize treatment, and chemical conversion treatment, may be performed to the R-T-B based sintered magnet obtained by the above steps (Surface Treating Step (Step S20)). As a result, the corrosion resistance can be further improved.

Note that, in the present embodiment, Machining Step (Step S18), Grain Boundary Diffusion Step (Step S19) and Surface Treating Step (Step S20) are performed, but these steps are not necessarily performed.

In this way, the R-T-B based sintered magnet according to the present embodiment is manufactured, and all of the treatments are finished. A magnet product is obtained by being magnetized.

The R-T-B based sintered magnet according to the present embodiment obtained in this way has the R—Co—Cu—N concentrated part in its grain boundary, and thus has an excellent corrosion resistance and favorable magnetic properties.

When the R-T-B based sintered magnet according to the present embodiment obtained in this way is used as a magnet for a rotary machine such as motor, the magnet can be used over a long term due to its high corrosion resistance, and a highly reliable R-T-B based sintered magnet can be provided. The R-T-B based sintered magnet according to the present embodiment is preferably used as a magnet of, for example, a surface magnet type (Surface Permanent Magnet: SPM) motor where a magnet is attached on the surface of a rotor, an interior magnet embedded type (Interior Permanent Magnet: IPM) motor such as inner rotor type brushless motor, and PRM (Permanent magnet Reluctance Motor). Specifically, the R-T-B based sintered magnet according to the present embodiment is preferably used for a spindle motor for a hard disk rotary drive or a voice coil motor of a hard disk drive, a motor for an electric vehicle or a hybrid car, an electric power steering motor for an automobile, a servo motor for a machine tool, a motor for vibrator of a cellular phone, a motor for a printer, a motor for a magnet generator and the like.

<Motor>

Figure 3:
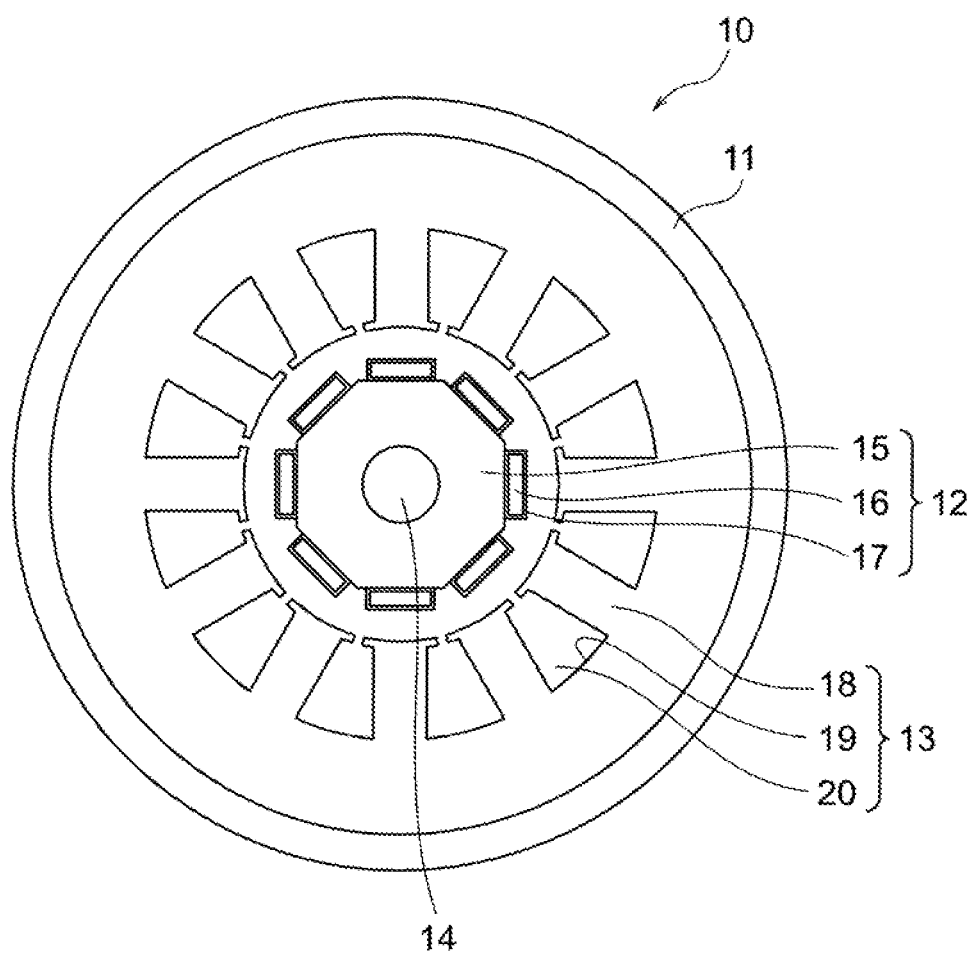
FIG. 3 is a cross-sectional view briefly showing the structure of a motor including an R-T-B based sintered magnet according to an embodiment.

Next, an embodiment of the R-T-B based sintered magnet according to the present embodiment used for a motor will be described. Here, an example of the R-T-B based sintered magnet according to the present embodiment applied to an SPM motor will be described. FIG. 3 is a cross-sectional view briefly showing the structure of an embodiment of an SPM motor. As shown in FIG. 3, an SPM motor 10 comprises a columnar shaped rotor 12, a cylindrical shaped stator 13, and a rotary shaft 14 in a housing 11. The rotary shaft 14 goes through the center of cross section of the rotor 12.

The rotor 12 comprises a rotor core (iron core) 15, multiple permanent magnets 16, and multiple magnet insert slots 17. The rotor core 15 is columnar shaped and made of such as iron material. The permanent magnets 16 are arranged at a predetermined interval on an outer peripheral surface of the rotor core 15. The magnet insert slots 17 contain the permanent magnets 16. The R-T-B based sintered magnet according to the present embodiment is used for the permanent magnet 16. The multiple permanent magnets 16 are provided to arrange N-pole and S-pole alternately in each magnet insert slot 17 along a circumferential direction of the rotor 12. As a result, the permanent magnets 16 adjacent along the circumferential direction generate magnetic field lines in mutually opposite directions along a radial direction of the rotor 12.

The stator 13 comprises multiple stator cores 18 and throttles 19 in a circumferential direction of inside of its cylindrical wall (peripheral wall). Both of them are arranged at a predetermined interval along outer peripheral surface of the rotor 12. The multiple stator cores 18 are arranged toward the center of the stator 13 to oppose the rotor 12. Further, a coil 20 is wound around inside of each throttle 19. The permanent magnets 16 and the stator cores 18 are arranged to oppose each other.

The rotor 12 is installed to be turnable together with the rotary shaft 14 in space of the stator 13. The stator 13 provides the rotor 12 with torque by electromagnetic action, and the rotor 12 rotates along the circumferential direction.

The SPM motor 10 uses the R-T-B based sintered magnet according to the present embodiment as the permanent magnet 16. The permanent magnet 16 shows high magnetic properties while showing corrosion resistance. Thus, the SPM motor 10 is capable of improving motor characteristics, such as torque characteristic, and showing a high output for a long term, and is excellent in reliability.

Second Embodiment

An embodiment of an R-T-B based sintered magnet according to a second embodiment will now be described. The R-T-B based sintered magnet according to the present embodiment is different from that of the first embodiment in the following points, and common parts will not be described partially.

Figure 1B:
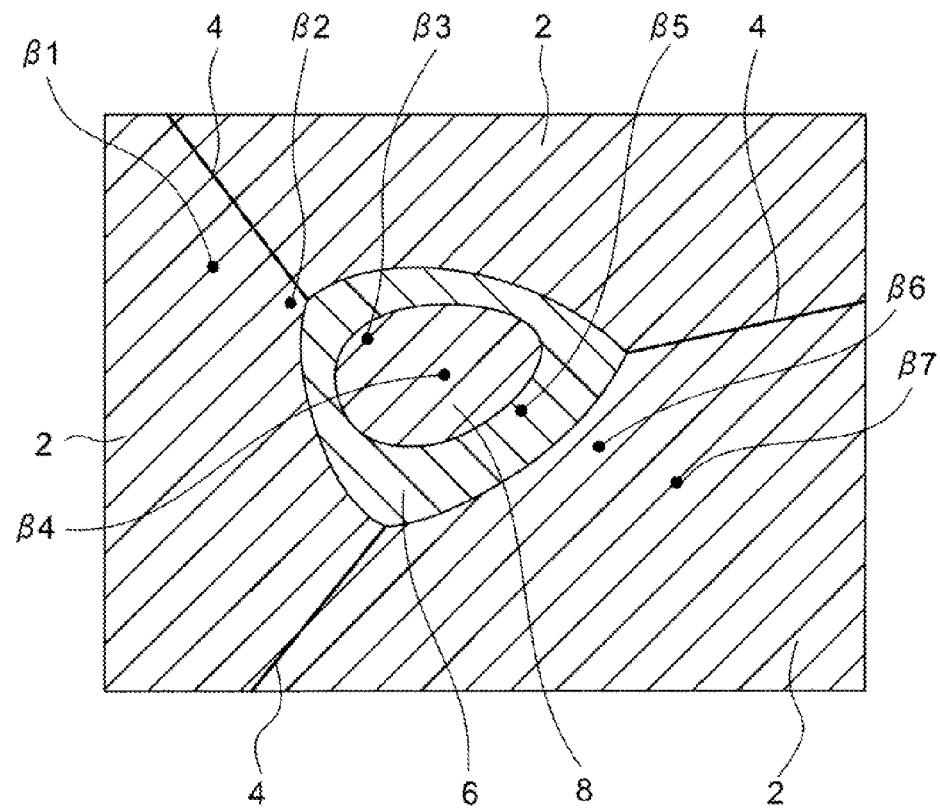
FIG. 1B is a diagram schematically showing a backscattered electron image around a grain boundary formed by a plural number of $R_2T_{14}B$ crystal grains of an R-T-B based sintered magnet according to an embodiment.

The R-T-B based sintered magnet according to the present embodiment is one having $R_2T_{14}B$ crystal grains. As shown in FIG. 1B, the R-T-B based sintered magnet according to the present embodiment has grains (main phases) 2 composed of the $R_2T_{14}B$ crystal grains and a sub concentrated part 8 in a grain boundary formed by the two or more adjacent grains 2. In the sub concentrated part 8, concentrations of R, O and C are higher than those in the grains 2. Alternatively, in the sub concentrated part 8, concentrations of R, O, C and N are higher than those in the grains 2.

In the present embodiment, especially in a triple junction 6, the grain boundary located around the sub concentrated part 8 further has an R—Co—Cu—N concentrated part whose concentrations of R, Co, Cu and N are higher than those in the grains 2. The sub concentrated part 8 is formed mainly in the triple junction 6. The R—Co—Cu—N concentrated part may be also formed in two-grain interfaces 4 other than in the triple junction 6. Further, an R-rich phase required for expressing coercivity HcJ may remain in the two-grain interfaces 4.

In the present embodiment, the R—Co—Cu—N concentrated part surrounds the sub concentrated part 8 and is present in a grain boundary area near an interface between the grain boundary area and the grains 2. In a grain boundary area having no sub concentrated part 8, the R—Co—Cu—N concentrated part may be present around the center thereof.

An R—O—C concentrated part containing R, O and C as its main component in the sub concentrated part 8 may contain any other components. Also, an R—O—C—N concentrated part containing R, O, C and N as its main component in the sub concentrated part 8 may contain any other component.

The R-T-B based sintered magnet according to the present embodiment needs to include a certain amount of oxygen (O). The certain amount varies based on other parameters or so, and is suitably determined. The amount of oxygen is preferably 500 ppm or more in view of corrosion resistance, and is preferably 2000 ppm or less in view of magnetic properties.

An amount of carbon (C) in the R-T-B based sintered magnet according to the present embodiment varies based on other parameters or so, and is suitably determined. Magnetic properties deteriorate when carbon amount increases, while the R—O—C concentrated part (or the R—O—C—N concentrated part, the same hereinafter) is not formed when carbon amount is small. Thus, carbon amount is preferably 400 ppm to 3000 ppm, more preferably 400 ppm to 2500 ppm, and still more preferably 400 ppm to 2000 ppm.

In the R-T-B based sintered magnet according to the present embodiment, the R—O—C concentrated part in the grain boundary preferably contains a ratio (O/R) of O atom to R atom in the R—O—C concentrated part satisfying the following formula (1). That is, (O/R) is preferably smaller than R oxides ($R_2O_3$, $RO_2$, RO and the like) of a stoichiometric ratio composition. Note that, in the present specification, a ratio of O atom to R atom is represented by (O/R). Presence of R—O—C concentrated part having (O/R) within a predetermined range in its grain boundary can achieve the following effects: hydrogen, which is produced by corrosion reaction between water and "R" in the R-T-B based sintered magnet, is effectively prevented from being stored in an inner R-rich phase; corrosion of the R-T-B based sintered magnet is prevented from progressing inwardly; and the R-T-B based sintered magnet according to the present embodiment shows good magnetic properties.

$$0<(O/R)<1 \quad (1)$$

Said (O/R) is preferable to satisfy the following formula (2). When (O/R) is less than 0.41, hydrogen, which is produced by corrosion reaction between water and "R" in the R-T-B based sintered magnet, cannot be sufficiently prevented from being stored in the grain boundary, and thus corrosion resistance of the R-T-B based sintered magnet tends to deteriorate. Also, when (O/R) is more than 0.70, consistency with its main phase grain becomes worse, and thus coercivity HcJ tends to deteriorate.

$$0.41 \leq (O/R) \leq 0.70 \quad (2)$$

(O/R) is preferable to further satisfy the following formula (3). By setting (O/R) within the following formula (3), corrosion resistance of R-T-B based sintered magnet can further improve.

$$0.50 \leq (O/R) \leq 0.70 \quad (3)$$

The R—O—C concentrated part is preferable to comprise a cubic crystal structure. With said cubic crystal structure, hydrogen can be prevented from further being stored in a grain boundary, and corrosion resistance of the R-T-B based sintered magnet according to the present embodiment can improve.

"R" contained in the R—O—C concentrated part preferably includes RL (a rare earth element at least includes either or both of Nd and Pr) and RH (a rare earth element at least includes either or both of Dy and Tb). By including both RL and RH in the R—O—C concentrated part, magnetic properties can further improve with excellent corrosion resistance.

The R-T-B based sintered magnet according to the present embodiment can be manufactured by adding a predetermined amount of raw materials to be an oxygen source and a carbon source that are different from the R-T-B based raw material alloy thereto, and by controlling manufacturing conditions, such as an oxygen concentration and a nitrogen concentration under an atmosphere of production processes.

An oxygen source of the R—O—C concentrated part can be powder including an oxide of element "M", where a standard free energy of formation of its oxide is higher than that of a rare earth element oxide. A carbon source of the R—O—C concentrated part can be the following material: a carbide of an element "M'", where a standard free energy of formation of its carbide is higher than that of a rare earth elements carbide; powder including carbon, such as graphite and carbon black; or an organic compound that produces carbon by thermal decomposition. Also, the oxygen source may be surface oxidized metal particles, and the carbon source may be metal particles including carbide, such as cast iron.

The R—O—C concentrated part formed in a grain boundary of the R-T-B based sintered magnet according to the present embodiment is considered to be produced as below. Namely, M oxide included in the added oxygen source has a standard free energy of formation of the oxide that is higher than that of an oxide of rare earth element "R". Thus, when a sintered body is manufactured by adding the oxygen source and the carbon source to the R-T-B based raw material alloy and sintering it, the M oxide is reduced by R-rich liquid phase generated during said sintering, and then M simple substance and "O" are produced. Also, when M' (standard free energy of formation of its carbide is higher than that of a rare earth element carbide) carbide is added as a carbon source, M' simple substance and "C" are produced likewise. These M and M' are stored in an $R_2T_{14}B$ crystal or an R-rich phase. On the other hand, "O" and "C" react with a part of the R-rich phase and deposit in a grain boundary, especially a polycrystalline grain boundary part, as the R—O—C concentrated part.

The conventional R-T-B based sintered magnet also includes "O" as an inevitable impurity by such as oxidization of raw material powder during pressing in the atmosphere. However, "O" included at this time is in a form of R oxide due to oxidization of rare earth element "R" in raw material powder, and thus it is considered not to be reduced during sintering process and to deposit as it is in a grain boundary in a form of R oxide.

On the other hand, during manufacturing process of the R-T-B based sintered magnet according to the present embodiment, each process of pulverization, pressing, and sintering of a raw material alloy is performed under an extremely low oxygen concentration (e.g., around 100 ppm or less) atmosphere, and thus R oxide is prevented from forming. As a result, "O" generated by reduction of M oxide during the sintering process and "C" added as a carbon source are considered to deposit in a grain boundary in a form of R—O—C concentrated part. Namely, although R oxide deposits in a grain boundary according to a conventional method, a predetermined amount of R—O—C concentrated part can deposit while preventing R oxides from forming in a grain boundary according to a method of the present embodiment.

Apart from the R—O—C concentrated part, R—C concentrated part, where R concentration and C concentration are higher than those of $R_2T_{14}B$ crystal grains, R—O concentrated part (including R oxide), where R concentration and O concentration are higher than those of $R_2T_{14}B$ crystal grains, and the like may be included in a grain boundary. In addition, an R-rich phase whose R concentration is higher than that of $R_2T_{14}B$ crystal grains is present. A certain amount of said R-rich phase is required for expression of coercivity HcJ, but there are preferably fewer the R—C concentrated part and the R—O concentrated part.

The R-T-B based sintered magnet according to the present embodiment is one where the R—O—C concentrated part and the R—Co—Cu—N concentrated part are formed in its grain boundary, and can prevent hydrogen from being stored in its grain boundary and prevent corrosion of "R" from progressing inwardly. Thus, the R-T-B based sintered magnet according to the present embodiment can have an excellent corrosion resistance and good magnetic properties.

A manufacturing method of the R-T-B based sintered magnet according to the present embodiment is the same as that of the first embodiment other than what is shown below. That is, in the present embodiment, an oxygen source and a carbon source that are different from a raw material alloy are added to a mixed powder. By adding a predetermined amount of the oxygen source and the carbon source that are different from a raw material alloy to the mixed powder, an intended R—O—C concentrated part can be formed in a grain boundary, which is formed by two or more adjacent $R_2T_{14}B$ crystal grains of the R-T-B based sintered magnet to be obtained.

The oxygen source can be powder including an oxide of element "M", where a standard free energy of formation of its oxide is higher than that of a rare earth element oxide. For example, "M" may be Al, Fe, Co, Zr and the like, but is not limited thereto. In addition, surface oxidized metal particles may be used.

The carbon source can be a carbide of an element "M'", where a standard free energy of formation of its carbide is higher than that of a rare earth element carbide, powder including carbon such as graphite and carbon black, an organic compound that produces carbon by thermal decomposition, and the like. For example, "M'" may be Si, Fe and the like, but is not limited thereto. In addition, powder including a carbide such as cast iron may be also used.

An adding method of the oxygen source and the carbon source is not limited, but they are preferably added when a finely pulverized powder is mixed or added to a coarsely pulverized powder before fine pulverization.

Note that, disclosed embodiments are not limited to the above-mentioned embodiments, and can be variously changed within a scope thereof.

EXAMPLES

Hereinafter, disclosed embodiments will be described in more detail based on Examples, but are not limited thereto.

Example 1

First, to obtain sintered magnets having Magnetic Composition I shown in Table 1, material alloys were manufactured by strip casting method. As the raw material alloys, a first alloy "A" that mainly forms a main phase of a magnet and a second alloy "a" that mainly forms a grain boundary were made and prepared based on the compositions shown in Table 1. Note that, in Table 1 (the same as in Table 2 and Tables 5 to 8 mentioned below), "bal." represents the balance when the whole composition of each alloy is 100 mass %, and "(T.RE)" represents a total mass % of rare earth elements.

TABLE 1

|  | Composition (Mass %) | | | | | | | | Mass Ratio |
|---|---|---|---|---|---|---|---|---|---|
|  | Nd | Dy | (T. RE) | Co | Al | Cu | B | Fe |  |
| First Alloy "A" | 28.50 | 1.50 | 30.00 | 0.50 | 0.20 | 0.00 | 1.05 | bal. | 95 |
| Second Alloy "a" | 30.00 | 20.00 | 50.00 | 20.00 | 0.20 | 3.00 | 0.00 | bal. | 5 |
| Magnet Composition I | 28.58 | 2.43 | 31.00 | 1.48 | 0.20 | 0.15 | 1.00 | bal. |  |

Next, hydrogen pulverization treatment (coarse pulverization) was performed by storing hydrogen in each of the raw material alloys at a room temperature, and then by performing dehydrogenation at 600° C. for an hour to the first alloy under Ar atmosphere and to the second alloy under Ar atmosphere including nitrogen gas of 300 ppm. In particular, the second alloy and nitrogen were reacted by performing the hydrogen pulverization treatment to the second alloy under Ar atmosphere including nitrogen gas.

Note that, in the present Example, each step (fine pulverization and pressing) from the hydrogen pulverization treatment to the sintering was performed under Ar atmosphere whose oxygen concentration was less than 50 ppm (this was the same as the following Examples and Comparative Examples).

Next, after the hydrogen pulverization and before fine pulverization, 0.1 mass % of zinc stearate as a pulverization aid was added to the coarsely pulverized powder of each of the alloys, and then mixed using Nauta Mixer. Thereafter, fine pulverization was performed using a jet mill to obtain a finely pulverized powder whose average particle diameter was 4.0 μm or so.

Then, the finely pulverized powder of the first alloy and that of the second alloy were mixed using Nauta Mixer at a mass ratio of 95/5, and a mixed powder that was a raw material powder of an R-T-B based sintered magnet was prepared.

The obtained mixed powder was filled in a press mold placed in an electromagnet and pressed in a magnetic field of 1200 kA/m with pressure of 120 MPa to obtain green compacts.

Subsequently, the obtained green compacts were held and fired in a vacuum at 1060° C. for 4 hours, and then rapidly cooled to obtain sintered bodies (R-T-B based sintered magnets) having Magnetic Composition I shown in Table 1. Next, a two-step aging treatment was performed to the obtained sintered bodies at 850° C. for an hour and at 540°

C. for 2 hours (both under Ar atmosphere), and R-T-B based sintered magnets of Example 1 were obtained.

Example 2

R-T-B based sintered magnets of Example 2 were obtained in the same way as Example 1, except that a second alloy "b" having a composition shown in Table 2 was used as a raw material alloy to obtain a sintered magnet having Magnet Composition II shown in Table 2.

TABLE 2

|  | Composition (Mass %) | | | | | | | Mass |
|---|---|---|---|---|---|---|---|---|
|  | Nd | Dy | (T. RE) | Co | Al | Cu | B | Fe | Ratio |
| First Alloy "A" | 28.50 | 1.50 | 30.00 | 0.50 | 0.20 | 0.00 | 1.05 | bal. | 95 |
| Second Alloy "b" | 30.00 | 20.00 | 50.00 | 30.00 | 0.20 | 4.50 | 0.00 | bal. | 5 |
| Magnet Composition II | 28.58 | 2.43 | 31.00 | 1.98 | 0.20 | 0.23 | 1.00 | bal. | |

Example 3

R-T-B based sintered magnets of Example 3 were obtained in the same way as Example 1, except that when a mixed power that was a raw material powder of the R-T-B based sintered magnet was mixed, the first alloy and the second alloy were arranged at a ratio of 95/5 and further mixed after adding alumina particles of 0.2% and carbon black particles of 0.02%.

Comparative Example 1

R-T-B based sintered magnets of Comparative Example 1 were obtained in the same way as Example 1, except that hydrogen pulverization treatment was performed to a second alloy under Ar atmosphere whose nitrogen gas concentration was 100 ppm or less.
<Evaluation>
[Composition Analysis]

Composition analysis was performed to the R-T-B based sintered magnets obtained in Examples 1 to 3 and Comparative Example 1 by X-ray fluorescent analysis and inductively coupled plasma mass spectrometry (ICP-MS method). As a result, it was confirmed that all of the R-T-B based sintered magnets had the same compositions as the source compositions (each composition shown in Tables 1 and 2), respectively.

[Structure Evaluation]

The surfaces of the cross sections of the R-T-B based sintered magnets obtained in Examples 1 to 3 and Comparative Example 1 were milled with an ion milling to remove influence of the outermost surface such as oxidation, and then an element distribution of the cross sections of the R-T-B based sintered magnets was observed by Electron Probe Micro Analyzer (EPMA) and analyzed. Specifically, a mapping analysis of each element of Nd, Co, Cu and N was performed to an area of 50 μm square, and a part where each element of Nd, Co, Cu and N was more highly distributed than the main phase grain was observed.

As a result, it was confirmed that the grain boundary of the R-T-B based sintered magnets of Examples 1 to 3 had an area (R—Co—Cu—N concentrated part) where concentrations of each element of Nd, Co, Cu and N were more highly distributed than those in a main phase crystal grain. On the other hand, it was not confirmed that the grain boundary of the R-T-B based sintered magnet of Comparative Example 1 had an R—Co—Cu—N concentrated part.

Further, with respect to the R-T-B based sintered magnets of Examples 1 to 3, where an R—Co—Cu—N concentrated part was observed in the grain boundary, a quantitative analysis with EPMA was performed to each of the R—Co—Cu—N concentrated parts (5 points) and inside of the grain of the main phase (1 point). The results are shown in Table 3.

Note that, the composition ratio in Table 3 is a ratio of each element when the total atom number of Nd, Fe, Co, Cu and N is 100.

TABLE 3

|  |  | Composition Ratio (%) | | | | |
|---|---|---|---|---|---|---|
|  |  | Nd | Fe | Co | Cu | N |
| Example 1 | Grain Boundary Phase Point 1 | 62 | 6 | 12 | 6 | 14 |
|  | Grain Boundary Phase Point 2 | 64 | 8 | 11 | 7 | 10 |
|  | Grain Boundary Phase Point 3 | 62 | 6 | 13 | 5 | 14 |
|  | Grain Boundary Phase Point 4 | 62 | 6 | 13 | 6 | 13 |
|  | Grain Boundary Phase Point 5 | 65 | 5 | 10 | 5 | 15 |
|  | Main Phase | 12 | 86 | 2 | 0 | 0 |
| Example 2 | Grain Boundary Phase Point 1 | 63 | 5 | 12 | 6 | 14 |
|  | Grain Boundary Phase Point 2 | 63 | 7 | 12 | 5 | 13 |
|  | Grain Boundary Phase Point 3 | 62 | 6 | 12 | 7 | 13 |
|  | Grain Boundary Phase Point 4 | 60 | 10 | 13 | 4 | 13 |
|  | Grain Boundary Phase Point 5 | 64 | 4 | 14 | 7 | 11 |
|  | Main Phase | 12 | 85 | 3 | 0 | 0 |
| Example 3 | Grain Boundary Phase Point 1 | 61 | 6 | 13 | 6 | 14 |
|  | Grain Boundary Phase Point 2 | 64 | 5 | 12 | 6 | 13 |
|  | Grain Boundary Phase Point 3 | 65 | 5 | 11 | 6 | 13 |
|  | Grain Boundary Phase Point 4 | 62 | 9 | 12 | 5 | 12 |
|  | Grain Boundary Phase Point 5 | 64 | 7 | 10 | 6 | 13 |
|  | Main Phase | 12 | 86 | 2 | 0 | 0 |

As shown in Table 3, by the quantitative analysis with EPMA, it was also confirmed that the grain boundary of the R-T-B based sintered magnets of Examples 1 to 3 had an area (an R—Co—Cu—N concentrated part) where concentrations of each element of Nd, Co, Cu and N were more highly distributed than those in a main phase crystal grain.

FIG. 4A and FIG. 4B show characteristic X-ray intensity distribution of each element when analysis with EPMA was performed on and nearby the grain boundaries of Example 1 and Example 3. In FIG. 4A and FIG. 4B, the horizontal axis represents each measurement position around the grain boundary. The horizontal axis of FIG. 4A corresponds to measurement positions along measurement points of α1 to α7 of FIG. 1A. Also, the horizontal axis of FIG. 4B corresponds to measurement positions along measurement points of β1 to β7 of FIG. 1B. In FIG. 4A and FIG. 4B, the vertical axis represents a characteristic X-ray intensity of each element. Although a value of the characteristic X-ray intensity shown here is not necessarily a parameter accurately indicating concentrations of each element due to inclusion of such as background data during measurement unlike the concentrations of each element measured by the quantitative analysis, it is possible to determine which concentration of each element among the measurement positions is higher or lower by relative comparison. FIG. 4A and FIG. 4B do not represent a composition ratio among each element, but the characteristic X-ray intensity of each element at each measurement position as a whole.

As shown in FIG. 4A, it was confirmed that the grain boundary phase of Example 1 had an area (R—Co—Cu—N concentrated part) where concentrations of each element of Nd, Co, Cu, and N were more highly distributed than those in the main phase crystal grain. Note that, as shown in FIG. 4A, a concentration of Fe was largely changed at an interface between the main phase crystal grain and a grain boundary phase and a concentration of Fe was low in the grain boundary phase.

As shown in FIG. 4B, in Example 3, it was confirmed that the grain boundary phase had an area (R—O—C concentrated part or R—O—C—N concentrated part) where concentrations of each element of Nd, C, O, and N were more highly distributed than those in the main phase crystal grain. It was also confirmed that the vicinity of an interface with the main phase crystal grain in the grain boundary phase located around the area had an area (R—Co—Cu—N concentrated part) where concentrations of each element of Nd, Co, Cu, and N were more highly distributed than those in the main phase crystal grain. Note that, as shown in FIG. 4B, a concentration of Fe was largely changed in an interface between the main phase crystal grain and a grain boundary phase and a concentration of Fe was low in the grain boundary phase.

[Magnetic Properties]

Magnetic properties of the R-T-B based sintered magnets obtained in Examples 1 to 3 and Comparative Example 1 were measured using B—H tracer. Residual magnetic flux density Br and coercivity HcJ were measured as the magnetic properties. The results are shown in Table 4.

[Corrosion Resistance]

The R-T-B based sintered magnets obtained in Examples 1 to 3 and Comparative Example 1 were machined to a plate form of 13 mm×8 mm×2 mm. These plate-like magnets were left in a saturated water vapor atmosphere of 100% relative humidity at 120° C., for 200 hours and 2 atmospheric pressure, and then an amount of weight decrease due to corrosion was evaluated. The results are shown in Table 4.

TABLE 4

| | Magnetic Properties | | Amount of Weight Decrease in 200 Hours from Saturated |
|---|---|---|---|
| | Br (mT) | HcJ (kA/m) | PCT (mg/cm$^2$) |
| Example 1 | 1381 | 1676 | 2.6 |
| Example 2 | 1377 | 1662 | 0.9 |
| Example 3 | 1380 | 1622 | 0.7 |
| Comp. Example 1 | 1379 | 1659 | 33.9 |

As shown in Table 4, it was confirmed that the R-T-B based sintered magnets of Examples 1 to 3 had magnetic properties equivalent to those of the R-T-B based sintered magnet of Comparative Example 1 and had corrosion resistance greatly improved compared to that of the magnet of Comparative Example 1.

Example 4

An R-T-B based sintered magnet of Example 4 was obtained in the same way as Example 1, except that a first alloy "C" and a second alloy "c" shown in Table 5 were used as raw material alloys to obtain a sintered magnet having Magnet Composition III shown in Table 5.

TABLE 5

| | Composition (Mass %) | | | | | | | | | | | | Mass Ratio |
|---|---|---|---|---|---|---|---|---|---|---|---|---|---|
| | Nd | Pr | Dy | Tb | (T. RE) | Co | Al | Cu | Zr | Ga | B | Fe | |
| First Alloy "C" | 25.00 | 7.00 | 0.00 | 0.00 | 32.00 | 0.50 | 0.30 | 0.00 | 0.20 | 0.10 | 0.95 | bal. | 95 |
| Second Alloy "c" | 30.00 | 10.00 | 0.00 | 0.00 | 40.00 | 30.00 | 0.30 | 5.00 | 0.00 | 0.00 | 0.00 | bal. | 5 |
| Magnet Composition III | 25.25 | 7.15 | 0.00 | 0.00 | 32.40 | 1.98 | 0.30 | 0.25 | 0.19 | 0.10 | 0.90 | bal. | |

Example 5

An R-T-B based sintered magnet of Example 5 was obtained in the same way as Example 1, except that a first alloy "D" and a second alloy "d" shown in Table 6 were used as raw material alloys to obtain a sintered magnet having Magnet Composition IV shown in Table 6.

TABLE 6

| | Composition (Mass %) | | | | | | | | | | | | Mass Ratio |
|---|---|---|---|---|---|---|---|---|---|---|---|---|---|
| | Nd | Pr | Dy | Tb | (T. RE) | Co | Al | Cu | Zr | Ga | B | Fe | |
| First Alloy "D" | 25.00 | 0.00 | 4.00 | 0.00 | 29.00 | 0.00 | 0.20 | 0.00 | 0.40 | 0.00 | 1.00 | bal. | 95 |
| Second Alloy "d" | 24.00 | 8.00 | 18.00 | 0.00 | 50.00 | 35.00 | 0.00 | 2.00 | 0.00 | 0.00 | 0.00 | bal. | 5 |
| Magnet Composition IV | 24.95 | 0.40 | 4.70 | 0.00 | 30.05 | 1.75 | 0.19 | 0.10 | 0.38 | 0.00 | 0.95 | bal. | |

Example 6

An R-T-B based sintered magnet of Example 6 was obtained in the same way as Example 1, except that a first alloy "E" and a second alloy "e" shown in Table 7 were used as raw material alloys to obtain a sintered magnet having Magnet Composition V shown in Table 7.

TABLE 7

| | Composition (Mass %) | | | | | | | | | | | | Mass |
|---|---|---|---|---|---|---|---|---|---|---|---|---|---|
| | Nd | Pr | Dy | Tb | (T. RE) | Co | Al | Cu | Zr | Ga | B | Fe | Ratio |
| First Alloy "E" | 18.00 | 6.00 | 7.00 | 0.00 | 31.00 | 1.00 | 0.10 | 0.00 | 0.10 | 0.00 | 1.05 | bal. | 95 |
| Second Alloy "e" | 15.00 | 5.00 | 20.00 | 0.00 | 40.00 | 30.00 | 0.20 | 7.00 | 0.00 | 0.00 | 0.00 | bal. | 5 |
| Magnet Composition V | 17.85 | 5.95 | 7.65 | 0.00 | 31.45 | 2.45 | 0.11 | 0.35 | 0.10 | 0.00 | 1.00 | bal. | |

Example 7

An R-T-B based sintered magnet of Example 7 was obtained in the same way as Example 1, except that a first alloy "F" and a second alloy "f" shown in Table 8 were used as raw material alloys to obtain a sintered magnet having Magnet Composition VI shown in Table 8.

TABLE 8

| | Composition (Mass %) | | | | | | | | | | | | Mass |
|---|---|---|---|---|---|---|---|---|---|---|---|---|---|
| | Nd | Pr | Dy | Tb | (T. RE) | Co | Al | Cu | Zr | Ga | B | Fe | Ratio |
| First Alloy "F" | 24.00 | 8.00 | 0.00 | 0.00 | 32.00 | 0.20 | 0.25 | 0.00 | 0.00 | 0.20 | 0.88 | bal. | 95 |
| Second Alloy "f" | 25.00 | 0.00 | 0.00 | 10.00 | 35.00 | 30.00 | 0.00 | 6.00 | 0.00 | 0.00 | 0.00 | bal. | 5 |
| Magnet Composition VI | 24.05 | 7.60 | 0.00 | 0.50 | 32.15 | 1.69 | 0.24 | 0.30 | 0.00 | 0.19 | 0.84 | bal. | |

Comparative Example 2

An R-T-B based sintered magnet of Comparative Example 2 was obtained in the same way as Example 4, except that hydrogen pulverization treatment was performed to a second alloy "c" under Ar atmosphere whose nitrogen gas concentration was 100 ppm or less.

Comparative Example 3

An R-T-B based sintered magnet of Comparative Example 3 was obtained in the same way as Example 5, except that hydrogen pulverization treatment was performed to a second alloy "d" under Ar atmosphere whose nitrogen gas concentration was 100 ppm or less.

Comparative Example 4

An R-T-B based sintered magnet of Comparative Example 4 was obtained in the same way as Example 6, except that hydrogen pulverization treatment was performed to a second alloy "e" under Ar atmosphere whose nitrogen gas concentration was 100 ppm or less.

Comparative Example 5

An R-T-B based sintered magnet of Comparative Example 5 was obtained in the same way as Example 7, except that hydrogen pulverization treatment was performed to a second alloy "f" under Ar atmosphere whose nitrogen gas concentration was 100 ppm or less.

<Evaluation>
[Composition Analysis]

Composition analysis was performed to the R-T-B based sintered magnets obtained in Examples 4 to 7 and Comparative Examples 2 to 5 by X-ray fluorescent analysis and inductively coupled plasma mass spectrometry (ICP-MS method). As a result, it was confirmed that all of the R-T-B based sintered magnets had the same compositions as the source compositions (each composition shown in Tables 5 to 8), respectively.

[Structure Evaluation]

The surfaces of the cross sections of the R-T-B based sintered magnets obtained in Examples 4 to 7 and Comparative Examples 2 to 5 were milled with an ion milling to remove influence of the outermost surface such as oxidation, and then an element distribution of the cross sections of the R-T-B based sintered magnets was observed by Electron Probe Micro Analyzer (EPMA) and analyzed. Specifically, a mapping analysis of each element of Nd, Co, Cu and N was performed to an area of 50 µm square, and a part where each element of Nd, Co, Cu and N was more highly distributed than the main phase grain was observed.

As a result, it was confirmed that the grain boundary of the R-T-B based sintered magnets of Examples 4 to 7 had an area (R—Co—Cu—N concentrated part) where concentrations of each element of Nd, Co, Cu and N were more highly distributed than those in a main phase crystal grain. On the other hand, it was not confirmed that the grain boundary of the R-T-B based sintered magnets of Comparative Examples 2 to 5 had an R—Co—Cu—N concentrated part.

Further, with respect to the R-T-B based sintered magnets of Examples 4 to 7, where an R—Co—Cu—N concentrated part was observed in the grain boundary, a quantitative analysis was respectively performed by EPMA to the R—Co—Cu—N concentrated parts (5 points) and inside of the grain of the main phase (1 point). The results are shown in Table 9.

Note that, the composition ratio in Table 9 is a ratio of each element when the total atom number of Nd, Pr, Dy, Tb, Fe, Co, Cu and N is 100.

TABLE 9

| | | Composition Ratio (%) | | | | |
|---|---|---|---|---|---|---|
| | | Nd + Pr + Dy + Tb | Fe | Co | Cu | N |
| Example 4 | Grain Boundary Phase Point 1 | 59 | 10 | 13 | 5 | 13 |
| | Grain Boundary Phase Point 2 | 64 | 11 | 10 | 4 | 11 |

TABLE 9-continued

|  |  | Composition Ratio (%) | | | | |
| --- | --- | --- | --- | --- | --- | --- |
|  |  | Nd + Pr + Dy + Tb | Fe | Co | Cu | N |
|  | Grain Boundary Phase Point 3 | 56 | 13 | 14 | 7 | 10 |
|  | Grain Boundary Phase Point 4 | 57 | 12 | 13 | 6 | 12 |
|  | Grain Boundary Phase Point 5 | 59 | 12 | 12 | 5 | 12 |
|  | Main Phase | 13 | 84 | 3 | 0 | 0 |
| Example 5 | Grain Boundary Phase Point 1 | 65 | 8 | 15 | 4 | 8 |
|  | Grain Boundary Phase Point 2 | 66 | 9 | 13 | 5 | 7 |
|  | Grain Boundary Phase Point 3 | 65 | 11 | 11 | 3 | 10 |
|  | Grain Boundary Phase Point 4 | 66 | 10 | 14 | 2 | 8 |
|  | Grain Boundary Phase Point 5 | 68 | 7 | 12 | 4 | 9 |
|  | Main Phase | 13 | 85 | 2 | 0 | 0 |
| Example 6 | Grain Boundary Phase Point 1 | 62 | 7 | 12 | 7 | 12 |
|  | Grain Boundary Phase Point 2 | 62 | 9 | 14 | 5 | 10 |
|  | Grain Boundary Phase Point 3 | 61 | 8 | 14 | 6 | 11 |
|  | Grain Boundary Phase Point 4 | 64 | 9 | 13 | 5 | 9 |
|  | Grain Boundary Phase Point 5 | 59 | 10 | 12 | 6 | 13 |
|  | Main Phase | 13 | 84 | 3 | 0 | 0 |
| Example 7 | Grain Boundary Phase Point 1 | 58 | 15 | 14 | 3 | 10 |
|  | Grain Boundary Phase Point 2 | 63 | 13 | 13 | 2 | 9 |
|  | Grain Boundary Phase Point 3 | 61 | 11 | 12 | 4 | 12 |
|  | Grain Boundary Phase Point 4 | 61 | 15 | 14 | 2 | 8 |
|  | Grain Boundary Phase Point 5 | 59 | 14 | 12 | 4 | 11 |
|  | Main Phase | 13 | 85 | 2 | 0 | 0 |

As shown in Table 9, by the quantitative analysis with EPMA, it was confirmed that the grain boundary of the R-T-B based sintered magnets of Examples 4 to 7 had an area (R—Co—Cu—N concentrated part) where concentrations of each element of R (total of Nd+Pr+Dy+Tb), Co, Cu and N were more highly distributed than those in a main phase crystal grain.

[Magnetic Properties]

Magnetic properties of the R-T-B based sintered magnets obtained in Examples 4 to 7 and Comparative Examples 2 to 5 were measured using B—H tracer. Residual magnetic flux density Br and coercivity HcJ were measured as the magnetic properties. The results are shown in Table 10.

[Corrosion Resistance]

The R-T-B based sintered magnets obtained in Examples 4 to 7 and Comparative Examples 2 to 5 were machined to a plate form of 13 mm×8 mm×2 mm. These plate-like magnets were left in a saturated water vapor atmosphere of 100% relative humidity at 120° C., for 200 hours and 2 atmospheric pressure, and then an amount of weight decrease due to corrosion was evaluated. The results are shown in Table 10.

TABLE 10

|  | Magnetic Properties | | Amount of Weight Decrease in 200 Hours from Saturated |
| --- | --- | --- | --- |
|  | Br (mT) | HcJ (kA/m) | PCT (mg/cm$^2$) |
| Example 4 | 1364 | 1405 | 1.1 |
| Example 5 | 1344 | 1735 | 0.9 |
| Example 6 | 1287 | 2106 | 1.3 |
| Example 7 | 1351 | 1628 | 2.2 |
| Comp. Example 2 | 1368 | 1398 | 13.6 |
| Comp. Example 3 | 1344 | 1718 | 10.3 |
| Comp. Example 4 | 1284 | 2095 | 21.2 |
| Comp. Example 5 | 1349 | 1621 | 27.5 |

As shown in Table 10, it was confirmed that the R-T-B based sintered magnets of Examples 4 to 7 had magnetic properties equivalent to those of the R-T-B based sintered magnet of Comparative Examples 2 to 5 and had corrosion resistance greatly improved compared to that of the magnets of Comparative Examples 2 to 5.

DESCRIPTION OF THE REFERENCE NUMERALS 2 grain (main phase)
4 two-grain interface
6 triple junction
8 concentrated part
10 SPM motor
11 housing
12 rotor
13 stator
14 rotary shaft
15 rotor core (iron core)
16 permanent magnet
17 magnet insert slot
18 stator core
19 throttle
20 coil

The invention claimed is:

1. An R-T-B based sintered magnet comprising:
a plurality of $R_2T_{14}B$ crystal grains;
at least one grain boundary formed by two or more adjacent $R_2T_{14}B$ crystal grains; and
an R—Co—Cu—N concentrated part in the at least one grain boundary,
wherein concentrations of R, Co, Cu and N in the R—Co—Cu—N concentrated part are respectively higher than concentrations of R, Co, Cu and N in the plurality of $R_2T_{14}B$ crystal grains, and
a ratio of atom number composition of N to a total atom number composition in the R—Co—Cu—N concentrated part is in the range of 10% to 15%.

2. The R-T-B based sintered magnet as set forth in claim 1, further comprising an R—O—C concentrated part in the at least one grain boundary,
wherein concentrations of R, O and C in the R—O—C concentrated part are respectively higher than concentrations of R, O and C in the plurality of $R_2T_{14}B$ crystal grains.

3. The R-T-B based sintered magnet as set forth in claim 2, wherein the R—O—C concentrated part is formed within a boundary defined by the R—Co—Cu—N concentrated part in the grain boundary.

4. The R-T-B based sintered magnet as set forth in claim 1, further comprising an R—O—C—N concentrated part in the at least one grain boundary,
wherein concentrations of R, O, C and N in the R—O—C—N concentrated part are respectively higher than concentrations of R, O, C and N in the plurality of $R_2T_{14}B$ crystal grains.

5. The R-T-B based sintered magnet as set forth in claim 4, wherein the R—O—C—N concentrated part is formed within a boundary defined by the R—Co—Cu—N concentrated part in the grain boundary.

6. The R-T-B based sintered magnet as set forth in claim 1, wherein the at least one grain boundary is formed by two adjacent $R_2T_{14}B$ crystal grains.

7. The R-T-B based sintered magnet as set forth in claim 1, wherein the at least one grain boundary is formed by three adjacent $R_2T_{14}B$ crystal grains.

8. The R-T-B based sintered magnet as set forth in claim 1, wherein the plurality of $R_2T_{14}B$ crystal grains have a tetragonal crystal structure.

9. The R-T-B based sintered magnet as set forth in claim 1, wherein the plurality of $R_2T_{14}B$ crystal grains have an average crystal diameter in the range of 1 μm to 30 μm.

10. The R-T-B based sintered magnet as set forth in claim 1, wherein a ratio of an atom number composition of R to the total atom number composition in the R—Co—Cu—N concentrated part is in the range of 60% to 65%.

11. The R-T-B based sintered magnet as set forth in claim 1, wherein a ratio of atom number composition of Co to the total atom number composition in the R—Co—Cu—N concentrated part is in the range of 10% to 14%.

12. The R-T-B based sintered magnet as set forth in claim 1, wherein a ratio of atom number composition of Cu to the total atom number composition in the R—Co—Cu—N concentrated part is in the range of 4% to 7%.

13. The R-T-B based sintered magnet as set forth in claim 2, wherein the R—O—C concentrated part has a cubic crystal structure.

14. The R-T-B based sintered magnet as set forth in claim 2, wherein a ratio of an atom number of O to an atom number of R in the R—O—C concentrated part is in the range of less than 1.

15. The R-T-B based sintered magnet as set forth in claim 14, wherein the ratio of the atom number of O to the atom number of R in the R—O—C concentrated part is in the range of 0.5 to 0.7.

16. The R-T-B based sintered magnet as set forth in claim 1, wherein the content of R in the plurality of $R_2T_{14}B$ crystal grains is in the range of 25 mass % to 35 mass %.

17. The R-T-B based sintered magnet as set forth in claim 1, wherein the content of B in the plurality of $R_2T_{14}B$ crystal grains is in the range of 0.5 mass % to 1.5 mass %.

18. The R-T-B based sintered magnet as set forth in claim 1, wherein T comprises Fe and Co and the content of Co in the plurality of $R_2T_{14}B$ crystal grains is in the range of 0.3 mass % to 4.0 mass %.

19. An electric motor having a rotor comprising a permanent magnet, wherein the permanent magnet includes the R-T-B based sintered magnet as set forth in claim 1.

* * * * *